(12) United States Patent
Sievert (10) Patent No.: US 11,417,040 B1
(45) Date of Patent: Aug. 16, 2022

(54) MEDIA PREVIEW PLACEMENT WITHIN A GRAPHICAL USER INTERFACE

(71) Applicant: GoPro, Inc., San Mateo, CA (US)

(72) Inventor: Otto Sievert, Oceanside, CA (US)

(73) Assignee: GoPro, Inc., San Mateo, CA (US)

( * ) Notice: Subject to any disclaimer, the term of this patent is extended or adjusted under 35 U.S.C. 154(b) by 183 days.

(21) Appl. No.: 16/947,941

(22) Filed: Aug. 25, 2020

(51) Int. Cl.
*G06T 11/60* (2006.01)

(52) U.S. Cl.
CPC .......... *G06T 11/60* (2013.01); *G06T 2200/24* (2013.01)

(58) Field of Classification Search
CPC .............................. G06T 11/60; G06T 2200/24
See application file for complete search history.

(56) References Cited

U.S. PATENT DOCUMENTS

| | | | |
|---|---|---|---|
| 10,043,552 B1 * | 8/2018 | Martin | G11B 27/34 |
| 11,281,371 B1 * | 3/2022 | Kosowski | G06F 3/04845 |
| 2012/0072863 A1 * | 3/2012 | Akifusa | G06F 3/04883 715/784 |
| 2012/0072870 A1 * | 3/2012 | Akifusa | G06F 3/0482 715/830 |

* cited by examiner

*Primary Examiner* — Shen Shiau
(74) *Attorney, Agent, or Firm* — Esplin & Associates, PC (57) ABSTRACT

Multiple sinusoidal pathways may be used to determine placement of media previews on a graphical user interface. Center points may be placed along the multiple sinusoidal pathways such that a group of adjacent center points forms a triangle. Media previews may be arranged for presentation by placing centers of the media previews on the center points along the multiple sinusoidal pathways.

20 Claims, 7 Drawing Sheets

MEDIA PREVIEW PLACEMENT WITHIN A GRAPHICAL USER INTERFACE

FIELD

This disclosure relates to determining placement of media previews within a graphical user interface.

BACKGROUND

A graphical user interface may present previews of media files (e.g., images, videos). Using a computer to automatically generate arrangements of previews that are aesthetically pleasing may be difficult.

SUMMARY

This disclosure relates to determining placement of media previews within a graphical user interface. Preview information, pathway information, and/or other information may be obtained. The preview information may define previews of visual content. The previews of the visual content may include a first preview of first visual content, a second preview of second visual content, and/or other previews of other visual content. The pathway information may define multiple sinusoidal pathways. The multiple sinusoidal pathways may include a first sinusoidal pathway, a second sinusoidal pathway, and/or other sinusoidal pathways. Individual sinusoidal pathways may define potential points of placement for the previews of the visual content. The multiple sinusoidal pathways may travel along same direction and may be separated by a distance.

Placement of center points on the multiple sinusoidal pathways may be determined. Individual center points may define locations of placement of centers of the previews of the visual content. The center points may include a first center point on the first sinusoidal pathway, a second center point on the second sinusoidal pathway, and/or other center points. The previews of the visual content may be presented based on the placement of the center points on the multiple sinusoidal pathways and/or other information. The previews of the visual content may be presented such that a first center of the first preview of the first visual content is placed at the first center point on the first sinusoidal pathway and a second center of the second preview of the second visual content is placed at the second center point on the second sinusoidal pathway.

A system that determines placement of media previews within a graphical user interface may include one or more electronic storage, processor, and/or other components. The electronic storage may store preview information, information relating to previews of visual content, pathway information, information relating to sinusoidal pathways, information relating to placement of center points on sinusoidal pathways, and/or other information.

The processor(s) may be configured by machine-readable instructions. Executing the machine-readable instructions may cause the processor(s) to facilitate determining placement of media previews within a graphical user interface. The machine-readable instructions may include one or more computer program components. The computer program components may include one or more of a preview information component, a pathway information component, a placement component, a presentation component, and/or other computer program components.

The preview information component may be configured to obtain preview information and/or other information. The preview information may define previews of visual content. The previews of the visual content may include a first preview of first visual content, a second preview of second visual content, and/or other previews of other visual content. In some implementations, the previews of the visual content may include thumbnail images, thumbnail videos, and/or other previews of the visual content.

The pathway information component may be configured to obtain pathway information and/or other information. The pathway information may define multiple sinusoidal pathways. The multiple sinusoidal pathways may include a first sinusoidal pathway, a second sinusoidal pathway, and/or other sinusoidal pathways. Individual sinusoidal pathways may define potential points of placement for the previews of the visual content. The multiple sinusoidal pathways may travel along same direction. The multiple sinusoidal pathways may be separated by a distance.

In some implementations, the multiple sinusoidal pathways may travel along lateral direction. In some implementations, the distance by which the multiple sinusoidal pathways are separated may include a vertical separation distance. In some implementations, the distance by which the multiple sinusoidal pathways are separated may further include a phase separation distance.

The placement component may be configured to determine placement of center points on the multiple sinusoidal pathways. Individual center points may define locations of placement of centers of the previews of the visual content. The center points may include a first center point on the first sinusoidal pathway, a second center point on the second sinusoidal pathway, and/or other center points.

In some implementations, a group of adjacent center points may form a polygon. In some implementations, a group of three adjacent center points may form a triangle. In some implementations, the determination of the placement of the center points on the multiple sinusoidal pathways may be biased towards the group of three adjacent center points forming an equilateral triangle. In some implementations, the triangle formed by the group of three adjacent center points may deviate from the equilateral triangle to satisfy an overlap constraint. The overlap constraint may define a constraint of overlap between the previews of the visual content. In some implementations, the triangle formed by the group of three adjacent center points may deviate from the equilateral triangle to satisfy a gap constraint. The gap constraint may define a constraint of gap between the previews of the visual content.

The presentation component may be configured to present the previews of the visual content based on the placement of the center points on the multiple sinusoidal pathways and/or other information. The previews of the visual content may be presented such that a first center of the first preview of the first visual content is placed at the first center point on the first sinusoidal pathway and a second center of the second preview of the second visual content is placed at the second center point on the second sinusoidal pathway.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
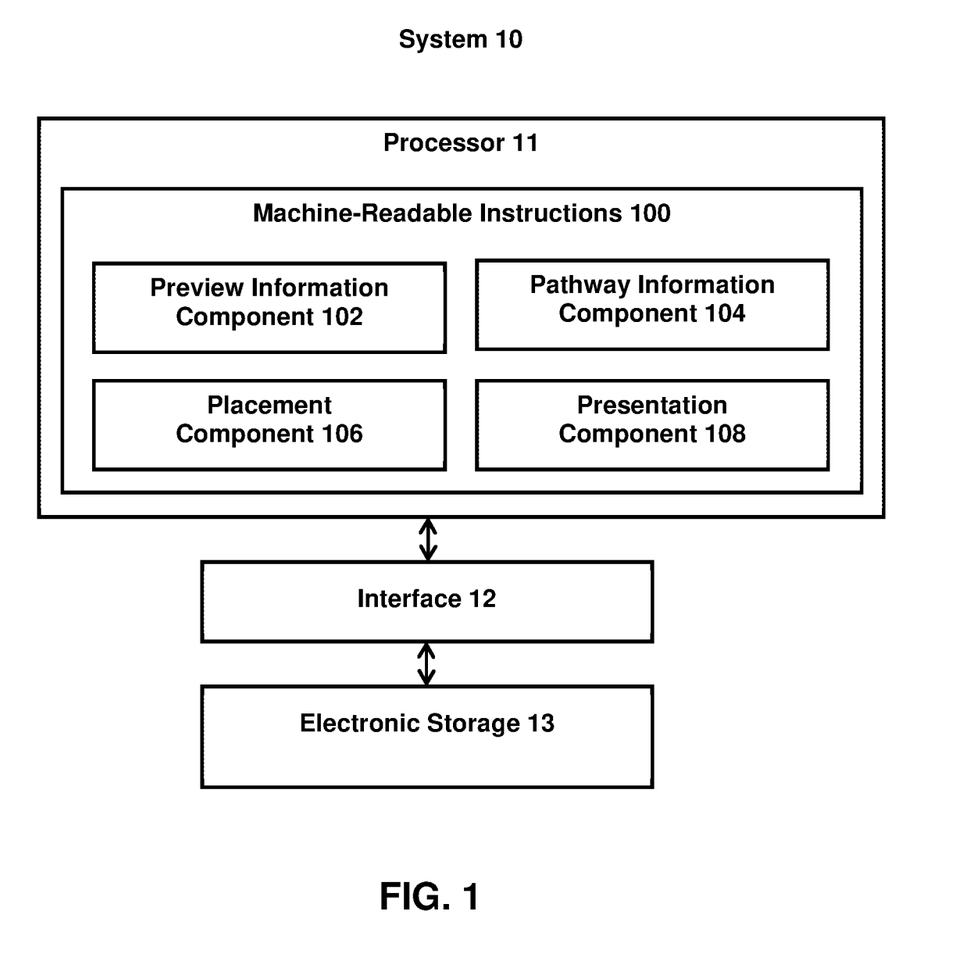
FIG. 1 illustrates a system that determines placement of media previews within a graphical user interface.

FIG. 1 illustrates a system 10 that determines placement of media previews within a graphical user interface. The system 10 may include one or more of a processor 11, an interface 12 (e.g., bus, wireless interface), an electronic storage 13, and/or other components. Preview information, pathway information, and/or other information may be obtained by the processor 11. The preview information may define previews of visual content. The previews of the visual content may include a first preview of first visual content, a second preview of second visual content, and/or other previews of other visual content. The pathway information may define multiple sinusoidal pathways. The multiple sinusoidal pathways may include a first sinusoidal pathway, a second sinusoidal pathway, and/or other sinusoidal pathways. Individual sinusoidal pathways may define potential points of placement for the previews of the visual content. The multiple sinusoidal pathways may travel along same direction and may be separated by a distance.

Placement of center points on the multiple sinusoidal pathways may be determined by the processor 11. Individual center points may define locations of placement of centers of the previews of the visual content. The center points may include a first center point on the first sinusoidal pathway, a second center point on the second sinusoidal pathway, and/or other center points. The previews of the visual content may be presented by the processor 11 based on the placement of the center points on the multiple sinusoidal pathways and/or other information. The previews of the visual content may be presented such that a first center of the first preview of the first visual content is placed at the first center point on the first sinusoidal pathway and a second center of the second preview of the second visual content is placed at the second center point on the second sinusoidal pathway.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store preview information, information relating to previews of visual content, pathway information, information relating to sinusoidal pathways, information relating to placement of center points on sinusoidal pathways, and/or other information.

Visual content may refer to content of image(s), video frame(s), and/or video(s) that may be consumed visually. For example, visual content may be included within one or more images and/or one or more video frames of a video. A video frame may include an image of the video at a moment within a progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate determining placement of media previews within a graphical user interface. The machine-readable instructions 100 may include one or more computer program components. The machine-readable instructions 100 may include one or more of a preview information component 102, a pathway information component 104, a placement component 106, a presentation component 108, and/or other computer program components.

The preview information component 102 may be configured to obtain preview information and/or other information. Obtaining preview information may include one or more of accessing, acquiring, analyzing, determining, examining, generating, identifying, loading, locating, opening, receiving, retrieving, reviewing, selecting, storing, and/or otherwise obtaining the preview information. The preview information component 102 may obtain preview information from one or more locations. For example, the preview information component 102 may obtain preview information from a storage location, such as the electronic storage 13, electronic storage of information and/or signals generated by one or more sensors, electronic storage of a device accessible via a network, and/or other locations. The preview information component 102 may obtain preview information from one or more hardware components (e.g., an image sensor) and/or one or more software components (e.g., software running on a computing device).

In some implementations, the preview information component 102 may obtain preview information based on user interaction with a user interface/application (e.g., image/video editing application, image/video viewer application), and/or other information. For example, a user interface/application may provide option(s) for a user to view visual content. Preview information defining previews of visual content may be obtained based on user selection of the visual content and/or user selection of other options relating to the visual content (e.g., selection of folders including visual content) through the user interface/application. Other selection of previews of visual content for retrieval of the previews of visual content are contemplated.

The preview information may define previews of visual content. A preview of visual content may refer to a lower-fidelity version (e.g., lower resolution version, lower color version, lower frame rate version) of the visual content. A preview of visual content may provide a lower-fidelity view of the visual content. For example, the previews of the visual content defined by the preview information may include thumbnail images, thumbnail videos, and/or other previews of the visual content. A thumbnail image may refer to a smaller image that represents a larger image (e.g., standalone image, a video frame of a video). A thumbnail video may refer to a small video that represents a larger video (e.g., a lower-resolution video clip of a video).

Previews of different visual content may have same/uniform aspect ratio and/or different aspect ratio. For example, previews of different images may all have the same/uniform aspect ratio. Previews of different images may have different aspect ratio. Previews of some images may have the same/uniform aspect ratio while previews of other images may have different aspect ratio. For example, previews of visual content may have aspect ratio of 1:1, 3:2, 2:3, 4:3, 3:4, 16:9, 9:16, 16:10, 10:16, and/or other aspect ratios. The placement of previews of visual content as disclosed herein enables aesthetically pleasing/non-uniformly spaced arrangement of previews with same/uniform aspect ratio and/or different aspect ratios. Rather than being limited to previews of fixed/constrained aspect ratios, the placement of previews of visual content as disclosed herein enables computer-generated arrangement of previews with non-fixed/unconstrained aspect ratios.

Preview information may define previews of visual content by including information that defines one or more content, qualities, attributes, features, and/or other aspects of the previews of the visual content. For example, the preview information may define a preview of visual content by including information that makes up the content of the preview and/or the visual content, and/or information that is used to determine the content of the preview and/or the visual content. For instance, the preview information may include information that makes up and/or is used to determine the arrangement of pixels, characteristics of pixels, values of pixels, and/or other aspects of pixels that define a thumbnail image of a larger image. Other types of preview information are contemplated.

Preview information may be stored within a single file or multiple files. For example, preview information defining thumbnail image(s) of larger image(s) may be stored within an image file, multiple image files, a combination of different files, and/or other files. In some implementations, preview information defining previews of visual content may be generated for and/or by the preview information component 102.

Preview information may define previews of multiple visual content. Multiple visual content may include different visual content. Multiple visual content may include different visual content of same type (e.g., different images) and/or different visual content of different types (e.g., images and videos). For example, the visual content may include first visual content, second visual content, and/or other visual content, and the previews of the visual content may include a first preview of the first visual content, a second preview of the second visual content, and/or other previews of other visual content.

The pathway information component 104 may be configured to obtain pathway information and/or other information. Obtaining pathway information may include one or more of accessing, acquiring, analyzing, determining, examining, generating, identifying, loading, locating, opening, receiving, retrieving, reviewing, selecting, storing, and/or otherwise obtaining the pathway information. The pathway information component 104 may obtain pathway information from one or more locations. For example, the pathway information component 104 may obtain pathway information from a storage location, such as the electronic storage 13, electronic storage of information and/or signals generated by one or more sensors, electronic storage of a device accessible via a network, and/or other locations. The pathway information component 104 may obtain pathway information from one or more hardware components and/or one or more software components (e.g., software running on a computing device).

In some implementations, the pathway information component 104 may obtain pathway information based on user interaction with a user interface/application (e.g., image/video editing application, image/video viewer application), and/or other information. For example, a user interface/application may provide option(s) for a user to select sinusoidal paths from which arrangements of visual content previews may be determined. Pathway information defining sinusoidal pathways may be obtained based on user selection of the sinusoidal pathways and/or user selection of other options relating to the sinusoidal pathways (e.g., selection of options used to generate sinusoidal pathways) through the user interface/application. Other selection of sinusoidal pathways for retrieval of the sinusoidal pathways are contemplated.

Pathway information may define multiple sinusoidal pathways. The multiple sinusoidal pathways may include a first sinusoidal pathway, a second sinusoidal pathway, and/or other sinusoidal pathways. A sinusoidal pathway may refer to a pathway that runs in a sinusoidal manner. A sinusoidal pathway may refer to a line with a smooth periodic oscillation. For example, a sinusoidal pathway may include a line that follows a sine wave. In some implementations, the multiple sinusoidal pathways may include two sinusoidal pathways. Two sinusoidal pathways may be used to determine placement of previews in a two-row layout. In some implementations, the multiple sinusoidal pathways may include more than two sinusoidal pathways. More than two sinusoidal pathways may be used to determine placement of preview in layout with more than two rows (e.g., three-row layout, four-row layout).

Individual sinusoidal pathways may define potential points of placement for the previews of the visual content. That is, individual points of the sinusoidal pathways may be potential points at which previews of the visual content may be placed. For example, centers of the previews of the visual content may be placed at points of the sinusoidal pathways to automatically generate arrangements of previews that are aesthetically pleasing.

Multiple sinusoidal pathways may travel along the same direction. That is, multiple sinusoidal pathways may run along the same direction. Multiple sinusoidal pathways traveling along the same direction may form a flow, in a single direction, of potential points of placement for the previews of the visual content. The direction in which the multiple sinusoidal pathways travel may determine the general direction in which the previews of the visual content are laid out. For example, multiple sinusoidal pathways may travel in a lateral direction, a vertical direction, or a diagonal direction to provide for arrangements of previews in which the placement of the previews follow a flow in the lateral direction, the vertical direction, or the diagonal direct, respectively.

The multiple sinusoidal pathways may be separated by one or more distances. Different adjacent pairs of sinusoidal pathways may be separated by the same distance or different distances. In some implementations, multiple sinusoidal pathways may be separated so that the multiple sinusoidal pathways do not cross. In some implementations, multiple sinusoidal pathways may be separated so that the multiple sinusoidal pathways cross at one or more points.

In some implementations, the distance(s) by which multiple sinusoidal pathways are separated may include a distance in the direction in which the multiple sinusoidal pathways travel, and/or a distance in a perpendicular direction to the direction in which the multiple sinusoidal pathways travel. For example, multiple sinusoidal pathways may travel along a lateral direction (left-right), and the distance by which the multiple sinusoidal pathways are separated may include a lateral (phase) separation distance and/or a vertical separation distance.

Figure 3:
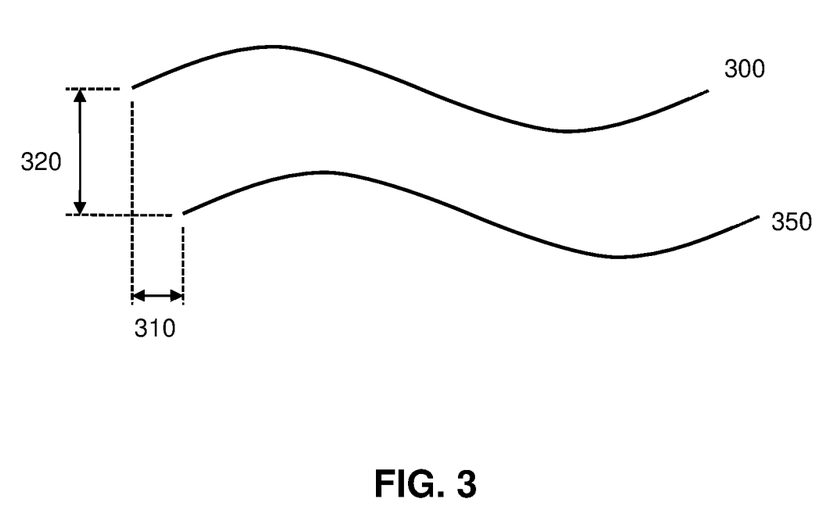
FIG. 3 illustrates example sinusoidal pathways.

FIG. 3 illustrates example sinusoidal pathways 300, 350. The sinusoidal pathways 300, 350 may travel in a lateral direction. As shown in FIG. 3, the sinusoidal pathways 300, 350 may be separated by a lateral (phase) separation distance 310 and a vertical separation distance 320. The lateral (phase) separation distance 310 and the vertical separation distance 320 of the sinusoidal pathways 300, 350 may determine the shape and/or size of the flow on which the previews of the visual content are placed.

Pathway information may define sinusoidal pathways by including information that defines one or more content, qualities, attributes, features, and/or other aspects of the sinusoidal pathways. For example, the pathway information may define a sinusoidal pathway by including information that makes up the shape, size, and/or length of the sinusoidal pathways, and/or information that is used to determine the shape, size, and/or length of the sinusoidal pathway. For instance, the pathway information may include information that makes up and/or is used to determine the amplitude, frequency/period, phase shift, and/or other aspects of a sinusoidal pathway. The pathway information may include information that defines and/or that is used to determine the distance(s) of separation between the sinusoidal pathways. Other types of pathway information are contemplated.

Pathway information may be stored within a single file or multiple files. In some implementations, pathway information defining sinusoidal pathways may be generated for and/or by the pathway information component 104.

Pathway information may define same and/or different sinusoidal pathways. For example, pathway information may define multiple sinusoidal pathways having the same amplitude, frequency/period, and phase shift. Pathway information may define multiple sinusoidal pathways having different amplitudes, frequencies/periods, and/or phase shifts. Pathway information may define multiple sinusoidal pathways that share one or more aspects while having one or more different aspects. For example, pathway information may define multiple sinusoidal pathways that have the same amplitude and frequency/period, while having different phase shifts.

The placement component 106 may be configured to determine placement of center points on the multiple sinusoidal pathways. The placement component 106 may be configured to determine where along the multiple sinusoidal pathways the center points should be placed. Individual center points may define locations of placement of centers of the previews of the visual content. That is, center points may correspond to locations at which the centers (e.g., horizontal center, vertical center, diagonal center, center of mass) of the previews of the visual content should be placed. For example, a center point may be placed on a sinusoidal pathway, and a center of a thumbnail of an image may be placed on top of the center point on the sinusoidal pathways. One or more center points may be placed on individual sinusoidal pathways. For example, the center points may include a first center point on the first sinusoidal pathway, a second center point on the second sinusoidal pathway, and/or other center points.

Figure 4:
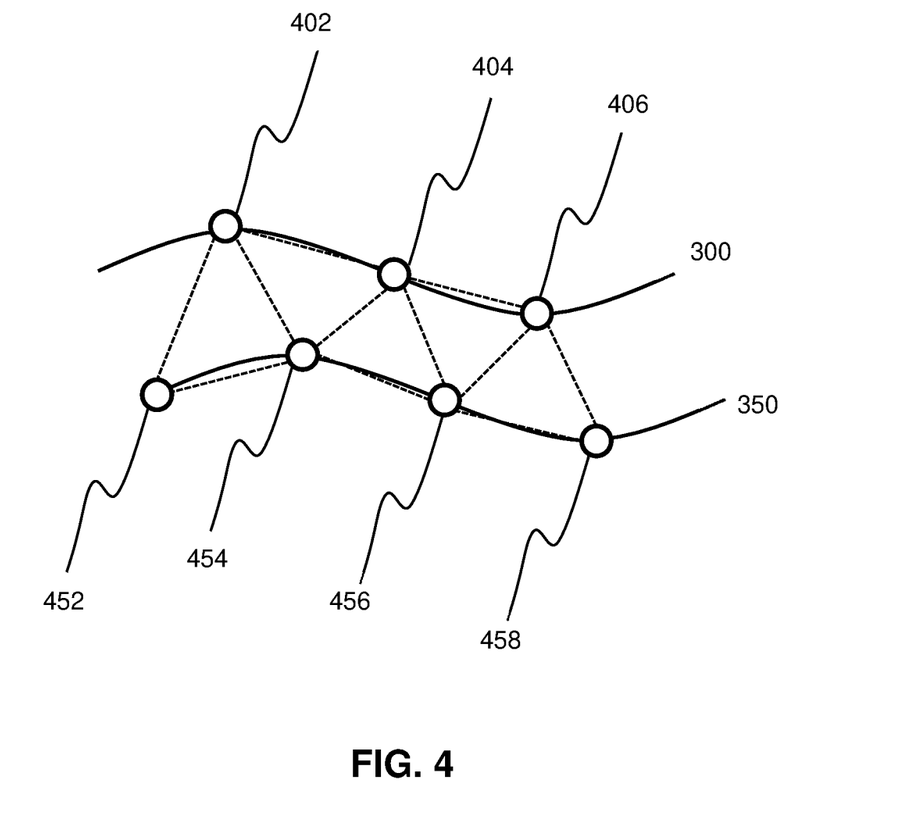
FIG. 4 illustrates example center points on sinusoidal pathways.

The placement of the center points may be determined so that previews of visual content placed on top of the center points has an organic flow. The curve of the sinusoidal pathways may introduce the organic flow in the placement of the center points. The curve of the sinusoidal pathways may introduce intentional offset/non-alignment in the placement of the previews of the visual content. That, the curve of the sinusoidal pathways may enable computer-generated arrangement of previews that are intentionally not aligned and/or non-uniformly spaced. Such arrangement of previews may be more aesthetically pleasing than aligned/uniformly-spaced arrangement of the previews. FIG. 4 illustrates example center points on the sinusoidal pathways 305. Center points 402, 404, 406 may be placed on the sinusoidal pathway 300, and center points 452, 454, 456, 458 may be placed on the sinusoidal pathway 350.

In some implementations, a group of adjacent center points may form a polygon. A group of adjacent center points may refer to multiple center points on the sinusoidal pathways that are next to each other. A group of adjacent center points may include three or more center points on two or more sinusoidal pathways. For example, a group of adjacent center points may include three adjacent center points on two (adjacent) sinusoidal pathways, and the three adjacent center points on the two sinusoidal pathways may form a polygon. Other numbers of center points and other numbers of sinusoidal pathways for the group of adjacent center points are contemplated.

In some implementations, the determination of the placement of the center points on the multiple sinusoidal pathways may be biased towards a group of three adjacent center points forming an equilateral triangle (a triangle with three equal sides). That is, the placement of the center points may be pushed, weighed, and/or otherwise biased so that a group of three adjacent center points (on two adjacent sinusoidal pathways) strives to form an equilateral triangle. Different groups of three adjacent center points may be biased towards forming equilateral triangles. Determination of placement of a group of three adjacent center points being biased towards forming an equilateral triangle may include the placement of the center points being determined so that the group of three adjacent center points forms an equilateral triangles or the shape formed by the group of three adjacent center points being similar to an equilateral triangle. A triangle may be similar to an equilateral triangle based on the sides of the triangle being within threshold distance(s) of each other (e.g., deviation of the length of a side from the length of another side of the triangle is capped, such as by a minimum distance value or a maximum distance value), based on inner angles being within threshold angle(s) of each other (e.g., deviation of an inner angle from 60 degrees is capped, such as by a minimum angle value or a maximum angle value). In some implementations, the triangle formed by a group of three adjacent center points may deviate from the equilateral triangle based on the center points being placed on the sinusoidal pathways. That is, the sinusoidal pathways may be arranged so that it is not possible for a group of three adjacent center points to form an exact equilateral triangle.

In some implementations, the triangle formed by a group of three adjacent center points may deviate from the equilateral triangle to satisfy one or more constraints. A constraint may place limits on where the center points may be placed on the sinusoidal pathways. A constraint may bias the center point placement determination towards the center points being placed at certain locations on the sinusoidal pathways. For example, the triangle formed by a group of three adjacent center points may deviate from the equilateral triangle to satisfy an overlap constraint. That is, to satisfy the overlap constraint, the shape of the triangle formed by a group of three adjacent center points may not form an exact equilateral triangle. An overlap constraint may define one or more constraints of overlap between the previews of the visual content. For example, an overlap constraint may set a maximum overlap between the previews of the visual content, and if the placement of the center points results in the overlap between the previews exceeding the maximum overlap, the corresponding center points may be pushed apart so that the overlap does not exceed the maximum overlap. An overlap constraint may set a minimum overlap between the previews of the visual content, and if the placement of the center points results in the overlap between the previews falling below the minimum overlap, the corresponding center points may be pushed closer together so that the overlap does not fall below the minimum overlap. An overlap constraint may set a target overlap between the previews of the visual content, with the placement of the center points on the multiple sinusoidal pathways may be biased towards the previews having the target overlap. Other types of overlap constraint are contemplated.

The triangle formed by a group of three adjacent center points may deviate from the equilateral triangle to satisfy a gap constraint. That is, to satisfy the gap constraint, the shape of the triangle formed by a group of three adjacent center points may not form an exact equilateral triangle. A gap constraint may define one or more constraints of gap between the previews of the visual content. For example, a gap constraint may set a maximum gap between the previews of the visual content, and if the placement of the center points results in the gap between the previews exceeding the maximum gap, the corresponding center points may be pushed closer together so that the gap does not exceed the maximum gap. A gap constraint may set a minimum gap between the previews of the visual content, and if the placement of the center points results in the gap between the previews falling below the minimum gap, the corresponding center points may be pushed apart so that the gap does not fall below the minimum gap. A gap constraint may set a target gap between the previews of the visual content, with the placement of the center points on the multiple sinusoidal pathways may be biased towards the previews having the target gap. Other types of overlap constraint are contemplated. Other types of constraints are contemplated.

For example, as shown in FIG. 4, the placement of the center points 402, 404, 406 on the sinusoidal pathway 300 and the placement of the center points 452, 454, 456, 458 on the sinusoidal pathway 350 may be determined so that different groups of adjacent center points approximate the shape of an equilateral triangle. For example, groups of adjacent center points that approximate the shape of an equilateral triangle include a group of adjacent center points 452, 402, 454, a group of adjacent center points 402, 454, 404, a group of adjacent center points 454, 404, 456, a group of adjacent center points 404, 456, 406, and a group of adjacent center points 456, 406, 458. These groups of adjacent center points may not form an exact equilateral triangle due to one or more constraints (e.g., overlap constraint, gap constraint). Formation of other shapes/polygons by the adjacent center points are contemplated.

The presentation component 108 may be configured to present the previews of the visual content. The previews of the visual content may be presented on one or more display. The previews of the visual content may be presented based on the placement of the center points on the multiple sinusoidal pathways and/or other information. Presentation of the previews of the visual content based on the placement of the center points on the multiple sinusoidal pathways may include arrangement of the previews so that the centers (e.g., horizontal center, vertical center, diagonal center, center of mass) of the previews of the visual content are located at center points on the multiple sinusoidal pathways. For example, the previews of the visual content may be presented based on the placement of the center points on the multiple sinusoidal pathways such that a first center of the first preview of the first visual content is placed at the first center point on the first sinusoidal pathway and a second center of the second preview of the second visual content is placed at the second center point on the second sinusoidal pathway. Such arrangement of the previews of the visual content may result in presentation of the previews that has a more organic flow than presentation of the previews using aligned/uniform arrangement (e.g., arrangement of previews on a grid).

Figure 5:
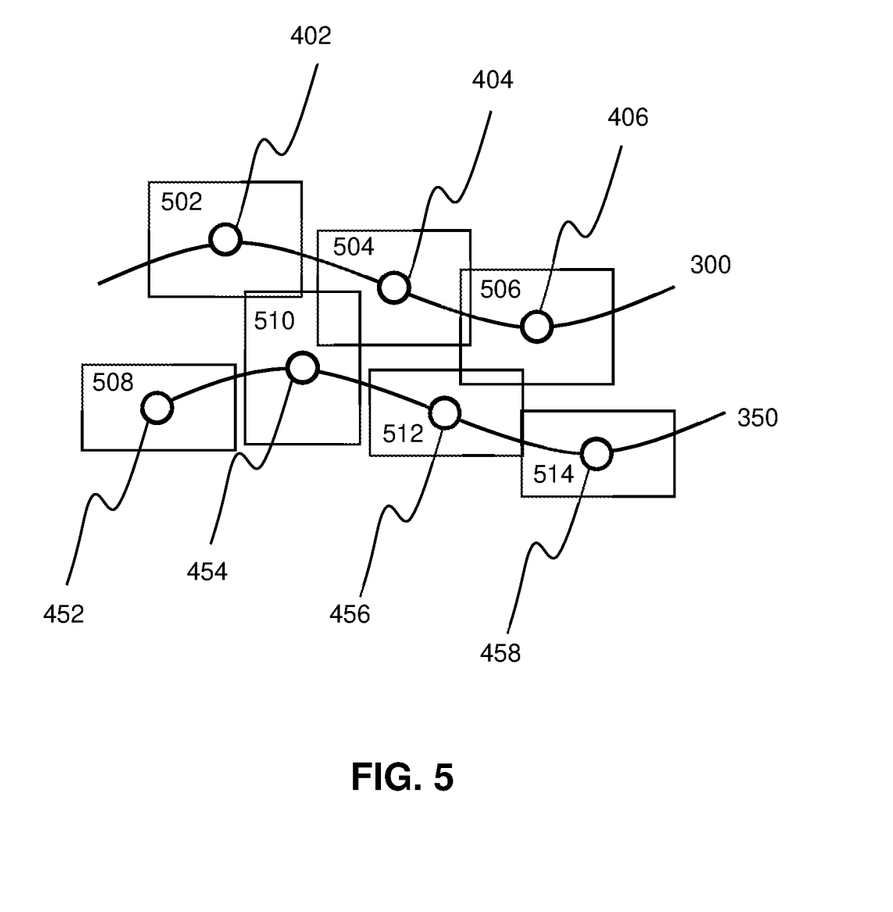
FIG. 5 illustrates an example arrangement of previews of visual content based on center points on sinusoidal pathways.

FIG. 5 illustrates an example arrangement of previews of visual content based on center points 402, 404, 406, 452, 454, 456 on the sinusoidal pathways 300, 350. In FIG. 5, previews 502, 504, 506, 508, 510, 512, 514 of visual content may be arranged for presentation. The center points 402, 404, 406, 452, 454, 456 on the sinusoidal pathways 300, 350 may be used as locations at which the centers of previews 502, 504, 506, 508, 510, 512, 514 of the visual content are placed. That is, the previews 502, 504, 506, 508, 510, 512, 514 of the visual content may be arranged so that the centers of the previews 502, 504, 506, 508, 510, 512, 514 are located at the center points 402, 404, 406, 452, 454, 456 on the sinusoidal pathways 300, 350. The arrangement of previews 502, 504, 506, 508, 510, 512, 514 may include the centers of the previews 502, 504, 506, 508, 510, 512, 514 striving to form equilateral triangles (subject to one or more constraints).

Figure 6:
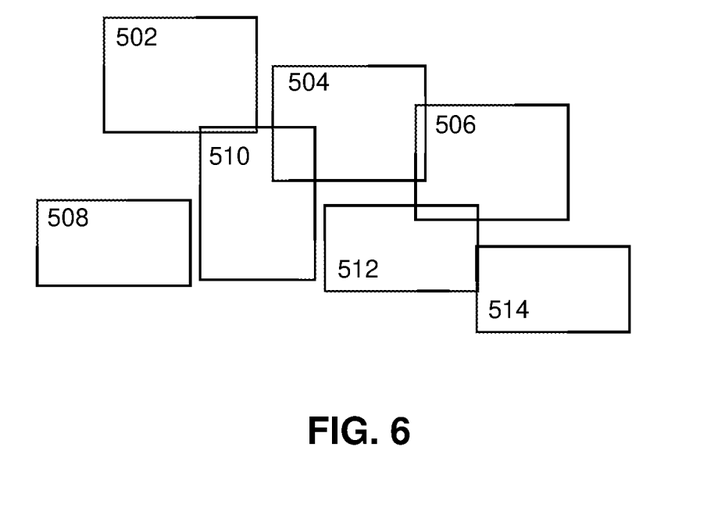
FIG. 6 illustrates an example presentation of previews of visual content based on placement of center points on sinusoidal pathways.

FIG. 6 illustrates an example presentation of previews of visual content based on placement of center points on sinusoidal pathways. FIG. 6, an outline of the arrangement of the previews 502, 504, 506, 508, 510, 512, 514 may be shown by excluding the center points and the sinusoidal pathways.

In some implementations, the previews of the visual content may be presented within one or more graphical user interface. A graphical user interface may refer a user interface that enables a user to interact with the system 10. For example, the graphical user interface within which the previews are presented may allow the user to provide input to the system 10 to present the previews of the visual content, present previews of different visual content (e.g., scroll through previews of visual content), present higher fidelity version of the visual content (e.g., see a higher resolution image/video by clicking on the corresponding preview), and/or otherwise interact with the system 10.

Figure 7:
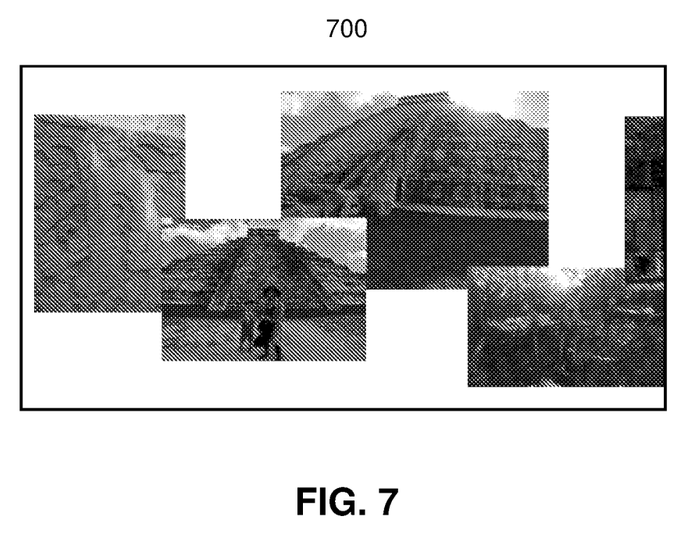
FIG. 7 illustrates an example presentation of previews of visual content on a graphical user interface.

FIG. 7 illustrates an example presentation of previews of visual content on a graphical user interface. The graphical user interface may include a section 700 that includes previews of visual content. For example, the section 700 may be part of the graphical user interface that presents previews of visual content, with the previews arranged with intentional offset as disclosed herein to offer aesthetically pleasing view of the previews.

While the present disclosure has been directed with respect to preview of visual content, one or more other implementations of the disclosure may be applied to visual content itself and/or other types of media content. For example, one or more implementations of the disclosure may be used to determine placement of visual content within a graphical user interface.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
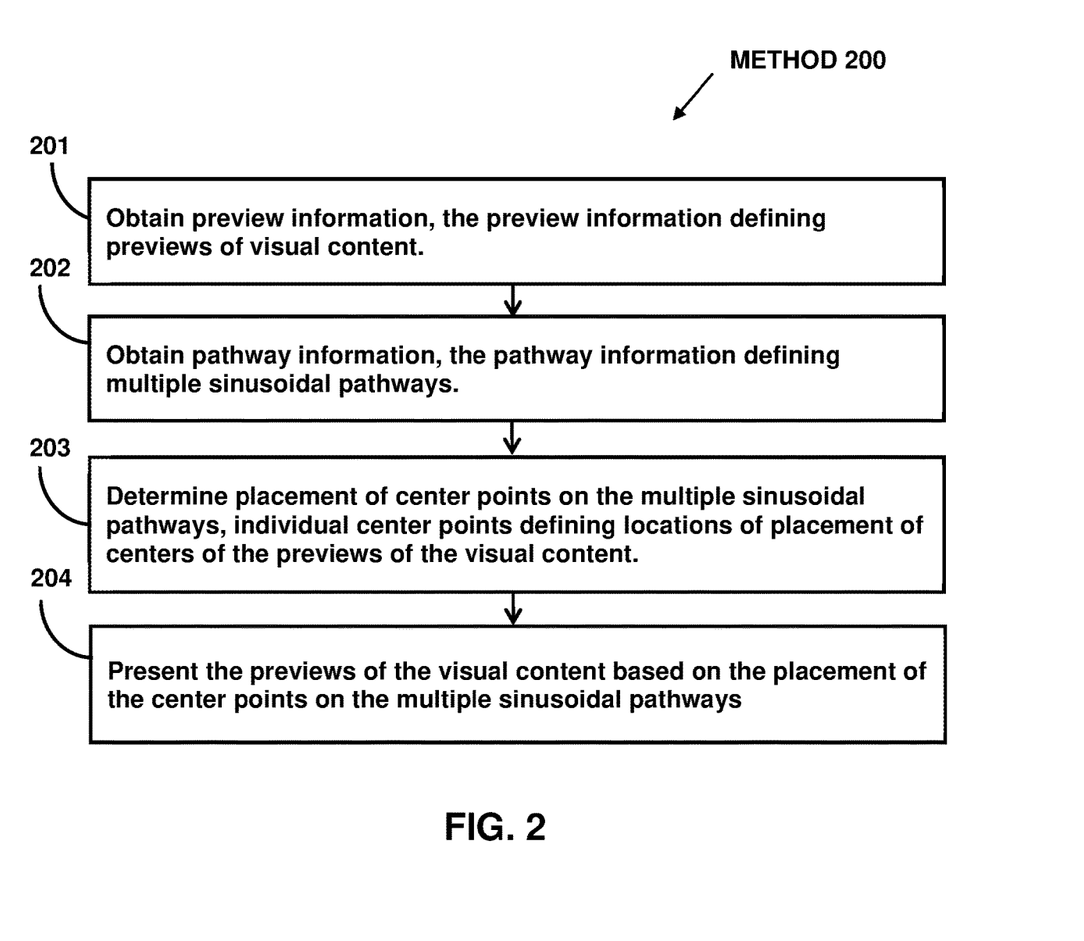
FIG. 2 illustrates a method for determining placement of media previews within a graphical user interface.

FIG. 2 illustrates method 200 for determining placement of media previews within a graphical user interface. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, preview information may be obtained. The preview information may define previews of visual content. The previews of the visual content may include a first preview of first visual content, a second preview of second visual content, and/or other previews of other visual content. In some implementations, operation 201 may be performed by a processor component the same as or similar to the preview information component 102 (Shown in FIG. 1 and described herein).

At operation 202, pathway information may be obtained. The pathway information may define multiple sinusoidal pathways. The multiple sinusoidal pathways may include a first sinusoidal pathway, a second sinusoidal pathway, and/or other sinusoidal pathways. Individual sinusoidal pathways may define potential points of placement for the previews of the visual content. The multiple sinusoidal pathways may travel along same direction and may be separated by a distance. In some implementations, operation 202 may be performed by a processor component the same as or similar to the pathway information component 104 (Shown in FIG. 1 and described herein).

At operation 203, placement of center points on the multiple sinusoidal pathways may be determined. Individual center points may define locations of placement of centers of the previews of the visual content. The center points may include a first center point on the first sinusoidal pathway, a second center point on the second sinusoidal pathway, and/or other center points. In some implementations, operation 203 may be performed by a processor component the same as or similar to the placement component 106 (Shown in FIG. 1 and described herein).

At operation 204, the previews of the visual content may be presented based on the placement of the center points on the multiple sinusoidal pathways and/or other information. The previews of the visual content may be presented such that a first center of the first preview of the first visual content is placed at the first center point on the first sinusoidal pathway and a second center of the second preview of the second visual content is placed at the second center point on the second sinusoidal pathway. In some implementations, operation 204 may be performed by a processor component the same as or similar to the presentation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for determining placement of media previews within a graphical user interface, the system comprising:
one or more physical processors configured by machine-readable instructions to:
obtain preview information, the preview information defining previews of visual content, the previews of the visual content including a first preview of first visual content and a second preview of second visual content;
obtain pathway information, the pathway information defining multiple sinusoidal pathways, the multiple sinusoidal pathways including a first sinusoidal pathway and a second sinusoidal pathway, individual sinusoidal pathways defining potential points of placement for the previews of the visual content, wherein the multiple sinusoidal pathways travel along same direction and are separated by a distance;
determine placement of center points on the multiple sinusoidal pathways, individual center points defining locations of placement of centers of the previews of the visual content, wherein the center points include a first center point on the first sinusoidal pathway and a second center point on the second sinusoidal pathway; and
present the previews of the visual content based on the placement of the center points on the multiple sinusoidal pathways such that a first center of the first preview of the first visual content is placed at the first center point on the first sinusoidal pathway and a second center of the second preview of the second visual content is placed at the second center point on the second sinusoidal pathway.

2. The system of claim 1, wherein the multiple sinusoidal pathways travel along lateral direction.

3. The system of claim 2, wherein the distance by which the multiple sinusoidal pathways are separated includes a vertical separation distance.

4. The system of claim 3, wherein the distance by which the multiple sinusoidal pathways are separated further includes a phase separation distance.

5. The system of claim 1, wherein a group of adjacent center points form a polygon.

6. The system of claim 5, wherein a group of three adjacent center points form a triangle.

7. The system of claim 6, wherein the determination of the placement of the center points on the multiple sinusoidal pathways is biased towards the group of three adjacent center points forming an equilateral triangle.

8. The system of 7, wherein the triangle formed by the group of three adjacent center points deviates from the equilateral triangle to satisfy an overlap constraint, the overlap constraint defining a constraint of overlap between the previews of the visual content.

9. The system of 8, wherein the triangle formed by the group of three adjacent center points deviates from the equilateral triangle to satisfy a gap constraint, the gap constraint defining a constraint of gap between the previews of the visual content.

10. The system of claim 1, wherein the previews of the visual content include thumbnail images and/or thumbnail videos.

11. A method for determining placement of media previews within a graphical user interface, the method performed by a computing system including one or more processors, the method comprising:
obtaining, by the computing system, preview information, the preview information defining previews of visual content, the previews of the visual content including a first preview of first visual content and a second preview of second visual content;

obtaining, by the computing system, pathway information, the pathway information defining multiple sinusoidal pathways, the multiple sinusoidal pathways including a first sinusoidal pathway and a second sinusoidal pathway, individual sinusoidal pathways defining potential points of placement for the previews of the visual content, wherein the multiple sinusoidal pathways travel along same direction and are separated by a distance;

determining, by the computing system, placement of center points on the multiple sinusoidal pathways, individual center points defining locations of placement of centers of the previews of the visual content, wherein the center points include a first center point on the first sinusoidal pathway and a second center point on the second sinusoidal pathway; and presenting, by the computing system, the previews of the visual content based on the placement of the center points on the multiple sinusoidal pathways such that a first center of the first preview of the first visual content is placed at the first center point on the first sinusoidal pathway and a second center of the second preview of the second visual content is placed at the second center point on the second sinusoidal pathway.

12. The method of claim 11, wherein the multiple sinusoidal pathways travel along lateral direction.

13. The method of claim 12, wherein the distance by which the multiple sinusoidal pathways are separated includes a vertical separation distance.

14. The method of claim 13, wherein the distance by which the multiple sinusoidal pathways are separated further includes a phase separation distance.

15. The method of claim 11, wherein a group of adjacent center points form a polygon.

16. The method of claim 15, wherein a group of three adjacent center points form a triangle.

17. The method of claim 16, wherein the determination of the placement of the center points on the multiple sinusoidal pathways is biased towards the group of three adjacent center points forming an equilateral triangle.

18. The method of 17, wherein the triangle formed by the group of three adjacent center points deviates from the equilateral triangle to satisfy an overlap constraint, the overlap constraint defining a constraint of overlap between the previews of the visual content.

19. The method of 18, wherein the triangle formed by the group of three adjacent center points deviates from the equilateral triangle to satisfy a gap constraint, the gap constraint defining a constraint of gap between the previews of the visual content.

20. The method of claim 11, wherein the previews of the visual content include thumbnail images and/or thumbnail videos.

* * * * *